Sept. 12, 1933.  A. NAUMANN  1,926,597
SYSTEM FOR VISUALLY TESTING PHOTOGRAPHIC NEGATIVES
Filed April 22, 1931

Inventor:
Arthur Naumann
by
Frank Reinford
Attorney.

Patented Sept. 12, 1933

1,926,597

UNITED STATES PATENT OFFICE 1,926,597

SYSTEM FOR VISUALLY TESTING PHOTOGRAPHIC NEGATIVES

Arthur Naumann, Berlin, Germany, assignor to the firm Voigtlander & Sohn Aktiengesellschaft, Braunschweig, Prussia, Germany, a joint stock company Application April 22, 1931, Serial No. 532,009, and in Germany July 22, 1930

12 Claims. (Cl. 88—14)

My invention relates to improvements in systems for visually testing photographic negatives, and the object of the improvements is to provide a system by means of which the strength of the light or the length of the exposure needed for printing photographs from the negative is directly indicated. With this object in view my invention consists in connecting a visual testing instrument with indicating means showing the intensity or the length of the exposure.

Another object of the improvements is to provide a system of the class indicated by means of which in addition to the intensity of the exposure the grade of the paper best suited for the character of the negative is indicated. As is known to those skilled in the art the grade of the said paper depends upon the difference of the densities of the negative, a negative of strong contrast giving the best results when printed on soft paper, while a soft or flat negative gives the best results when printed on vigorous paper. Therefore, in my improved system means for indicating the grade of the paper are provided which are dependent upon two measurements of the negative, one testing the lightest portions of the negative, and the other the most dense portions or more accurately the most dense portions or the parts of the negative which are most characteristic and for this reason should be clearly reproduced.

Other objects of the improvements will appear from the following description.

Figure 1:
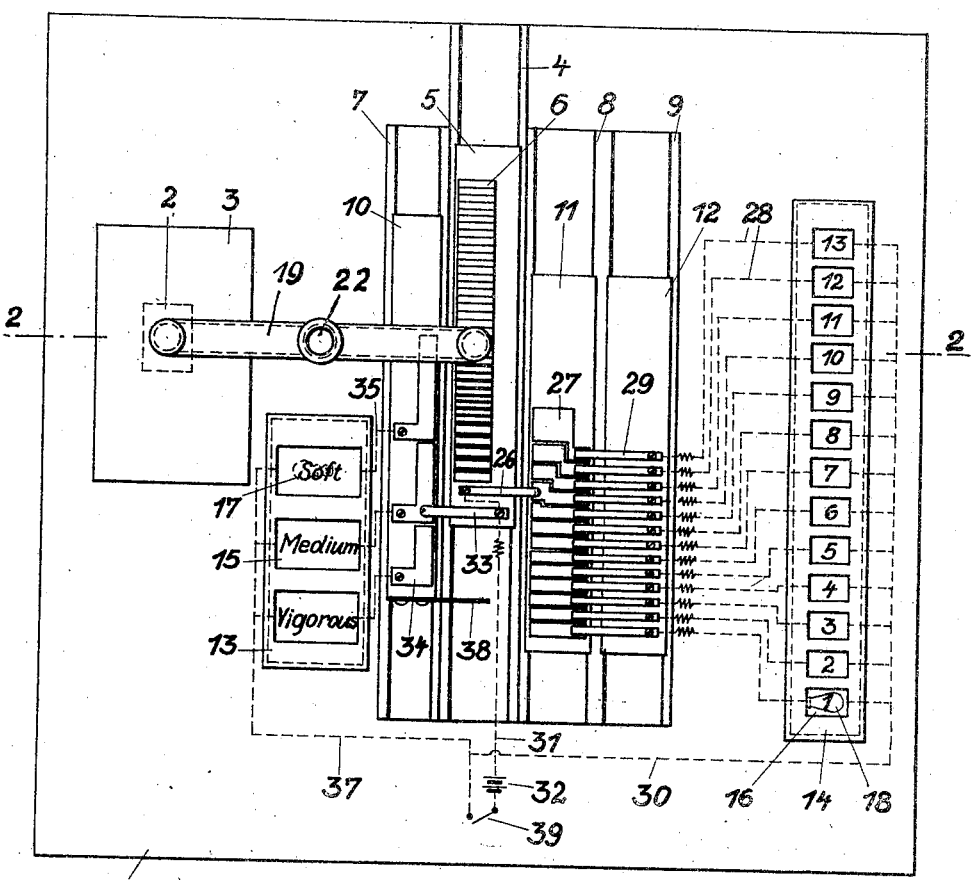
Figure 2:
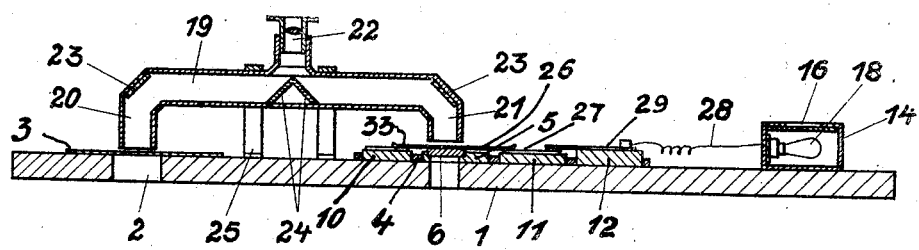
Figure 3:

For the purpose of explaining the invention an example embodying the same has been shown in the accompanying drawing in which the same reference characters have been used in all the views to indicate corresponding parts. In said drawing, Fig. 1 is an elevation of the system, Fig. 2 is a sectional plan view taken on the line 2—2 of Fig. 1, and Fig. 3 is a detail view showing a subsidiary density screen.

In the example shown in the figures my improved system comprises a frame or board 1 adapted to have the parts of the system mounted thereon. The said board is formed with an aperture 2 adapted to have the negative 3 placed before the same, a guide way 4 for a slide 5 carrying a density screen 6, and guide ways 7, 8 and 9 parallel to the guide way 4 and having contact carrying slides 10, 11 and 12 shiftable thereon. On the board 1 two indicating devices are mounted which as shown take the form of cases 13 and 14 formed with windows 15 and 16 and enclosing incandescent lamps 17 and 18, one for each window; the windows of case 13 being provided severally with the words "vigorous", "medium", and "soft" indicating the grade of the printing paper, and the windows of the case 14 being provided with the figures from 1 to 13 indicating the strength of the exposure.

The density screen 6 is used for visually ascertaining the density of the negative 3; and, for more conveniently comparing the negative with said screen, an optical instrument is provided which comprises a tube 19 having two branches 20 and 21 located respectively in front of the aperture 2 or the negative placed in front thereof and the density screen 6. The instrument additionally comprises an eyepiece 22, and angularly disposed mirrors 23, 23 and 24, 24, the said mirrors being adapted to direct the light rays which enter through the negative 3 and from the density screen 6 to the eyepiece 22. The tube 19 is supported on the board 1 by means of brackets 25.

The slide 5 on which the density screen 6 is rigidly mounted is provided with a contact spring 26, and the slide 11 has insulated contacts 27 fixed thereto, the said contacts being in position for engagement with the contact spring 26. The slide 12 carries contact springs 29 bearing one on each of the contacts 27. The contact springs 29 are connected by leads 28 respectively with the incandescent lamps 18 located within the casing 14 at the rear of the windows 16, and the said lamps and the contact spring 26 are connected by leads 30 and 31 with a source of electric energy 32. The leads 30, 31 include a switch 39. By such means, it will be perceived that the movable screen 6 becomes an index member, with respect to the series of lamps 18, and that the series of lamps 18 constitutes a scale of times of exposure.

Another contact spring 33 secured to the slide 5 is adapted to make contact with contact plates 34 secured to and insulated upon the slide 10, and the said contact plates 34 are connected by leads 35 with the incandescent lamps 17 located within the casing 13 at the rear of the windows 15. The said lamps and the contact spring 33 are connected by the lead 31 and a lead 37 with the source of electric energy 32. In this circuit also the switch 39 is included. To the slide 10 an arm 38 is secured which is in position for engagement with the end face of the slide 5.

The slides 10, 11 and 12 are shiftable in their guide ways 7, 8, and 9, and in the construction shown in the figures they are adapted to be shifted by hand, and it is understood that after being shifted to the desired positions they are held by friction. But I wish it to be understood that I do not limit myself to this construction, and that mechanical means such as screw or other gearings may be provided for shifting the slide.

The system is used as follows:

For ascertaining the necessary intensity of the exposure, the slides 11 and 12, after possible preliminary relative adjustment, are not shifted. The negative 3 is placed on the frame or board 1 in front of the aperture 2 thereof and at the rear of the branch 20 of the tube 19, in such position that a portion of the highest density of the important part of the scene is located below the said branch. Ordinarily in a landscape the sky is the most dense part of the negative, but I do not place the sky of the negative below the tube, but the most dense portion of the characteristic part of the landscape. The attendant looks through the eyepiece 22, whereupon the said part of the negative appears in the eyepiece laterally of the part of the density screen 6 located at the rear of the branch 21. The attendant then shifts slide 5 and with it density screen 6 until the negative and the density screen viewed through the eyepiece have the same shade. By thus shifting the density screen the spring contact 26 is brought into position for making contact with one of the members 27, and if now the circuit 28, 30, 31 is energized by closing the switch 39 one of the lamps 18 within the casing 14 is illuminated, so as to display one of the indications 1 to 13 borne by the windows 16, the said indication defining the requisite length of exposure.

The indications made by the lamps 18 may be adjusted relatively to density value by shifting the slides 11 and 12 relatively to each other. Such adjustment may be desirable for example for printing photographs having a specific character.

For ascertaining the grade of the paper which is best suited for printing, it is necessary to measure the difference of the densities of the lightest and the most dense parts of the negative, and for this purpose the negative is first placed into position with the lightest part in front of the tube 19, whereupon the density screen 6 is shifted so that the said part of the negative and the part of the screen inspected through the tube 19 have the same shade. Now the slide 10 is shifted until the arm 38 bears on the slide 5, whereupon the lamp 17 located at the rear of the window "vigorous" will (if the switch 39 be closed) be illuminated. Thereafter the negative 3 is moved and placed again with the most dense part of the scene in front of the tube 19, and the density screen 6 is shifted in the manner described above, while the slide 10 continues in position to which it has already been brought. Now the contact spring 33 will be in position for illuminating one or another of the lamps 17 located at the rear of the words "vigorous," "medium," or "soft," according as the negative is of strong or weak contrasts. If now the source of light is connected to the system the grade of the paper is indicated by one of the lamps 17. And at the same time, the length of exposure is indicated as before by one of the lamps 18.

If it is desired to print photographs of a specific character the slides 11 or 12 may be shifted so that another lamp 18 corresponds to each position of the density screen 6. In lieu thereof I may replace the density screen 6 by a screen of different permeability, or place a subsidiary density screen 41 such as is shown in Fig. 3 on the density screen 6, in which case the position to which the density screen is shifted when testing the negative is different from the position obtained by the method described above in which only the screen 6 is used.

I claim:

1. A system for ascertaining the factors of the exposure, for printing photographs from negatives, comprising an instrument for visually determining the density of the negative, indicating means showing exposure intensities and comprising a plurality of electric indicating devices and their circuits, a slide carrying a series of contact making members each connected with one of said circuits, and a contact cooperating with said contact making members and adapted to be shifted by said visual instrument into engagement with any of said contact making members, said slide being shiftable relatively to said instrument for varying the position of said contact making members relatively to said contact.

2. A system for ascertaining the factors of the exposure for printing photographs from negatives, comprising an instrument including a movable density screen for visually determining the density of the negative, indicating means showing grades of paper, a slide movable relatively to said instrument, means on said slide controlling said indicating means, and means connected with said density screen for rendering said controlling means operative.

3. A system for ascertaining the factors of the exposure for printing photographs from negatives, comprising an instrument including a movable density screen for visually determining the density of the negative, electrical indicating means showing grades of paper, a slide movable relatively to said instrument and carrying contacts respectively connected with said electrical indicating means, and a contact making member connected with said density screen and adapted for engagement with said contacts.

4. A system for ascertaining the factors of the exposure for printing photographs from negatives, comprising an instrument including a movable density screen for visually determining the density of the negative, indicating means comprising electric lamps and their circuits and showing grades of paper, a slide movable relatively to said instrument and carrying contacts respectively connected with said circuits, and a contact making member connected with said density screen and adapted for engagement with said contacts.

5. A system for ascertaining the factors of the exposure for printing photographs from negatives, comprising an instrument including a movable density screen for visually determining the density of the negative, electrical indicating means and their circuits showing exposure intensities, a contact making member movable with said density screen for supplying current to any one of said circuits, electrical indicating means and their circuits showing grades of paper, a slide carrying contacts connected with said circuits and movable relatively to said density screen, and a contact making member connected with said density screen and adapted for engagement with said contacts.

6. In a system for ascertaining the factors of exposure for printing photographs from negatives the combination of a frame, a density screen movable in said frame, whereby diversity in density as between different portions of a negative under test may be expressed in range of movement of said screen in said frame, a second member movable in said frame independently of said screen, the range of movement of such second member being limited by the position of the said screen, and means for indicating the range of movement of said second member made possible by an antecedent movement of said screen.

7. In a system for ascertaining the factors of exposure for printing photographs from negatives the combination of a frame, a density screen movable in said frame, whereby diversity in density as between different portions of a negative under test may be expressed in range of movement of said screen in said frame, a plurality of signal lights, a second member movable in said frame independently of said screen, the range of movement of such second member being limited by the position of the said screen, and means for illuminating one or another of said lights according to the range of movement of said second member made possible by an antecedent movement of said screen.

8. In a system for ascertaining the factors of exposure for printing photographs from negatives the combination of a frame, a density screen movable in said frame, whereby diversity in density as between different portions of a negative under test may be expressed in range of movement of said screen in said frame, a scale of intensity of exposure, with respect to which said screen moves as an index, a second member movable in said frame independently of said screen, the range of movement of such second member being limited by the position of the said screen, and means for indicating the range of movement of said second member made possible by an antecedent movement of said screen.

9. In a system for ascertaining the factors of exposure for printing photographs from negatives the combination of a frame, a density screen movable in said frame, a scale of intensity of exposure, with respect to which said screen moves as an index, and adjusting means as between screen and scale, whereby a given point in the density screen may be coordinated with one or another point in the scale.

10. In a system for ascertaining the factors of exposure for printing photographs from negatives the combination of a frame, means borne movably by the frame for testing a given negative against one or another of a plurality of unlike standard density values, whereby diversity in density as between different portions of a negative under test may be expressed in range of movement of said means, a slide movable in said frame independently of said movably borne means, the range of movement of such slide being limited by the position of the said movably borne means, and means for indicating the range of movement of said slide made possible by an antecedent movement of the means first named.

11. In a system for ascertaining the factors of exposure for printing photographs from negatives the combination of a frame, a slide borne by the frame, said slide being equipped with a density screen, a second density screen removably associated with said slide, whereby a given negative may be tested against one or another of a plurality of unlike series of standard density values, and a scale of intensity of exposure with respect to which said means move as an index.

12. In a system for ascertaining the factors of exposure for printing photographs from negatives the combination of a frame, a density screen bearing a contact piece movable in said frame, a slide bearing a plurality of contact pieces movable in said frame, a plurality of signal lights, one for each slide-borne contact piece, and means for completing a light-energizing circuit through the screen-borne contact piece and through that one of the slide-borne contact pieces with which at the time the screen-borne contact piece is in contact.

ARTHUR NAUMANN.